(No Model.)
C. B. HARDIN & J. D. MOSBY.
HORSE DETACHER.
No. 604,469. Patented May 24, 1898.
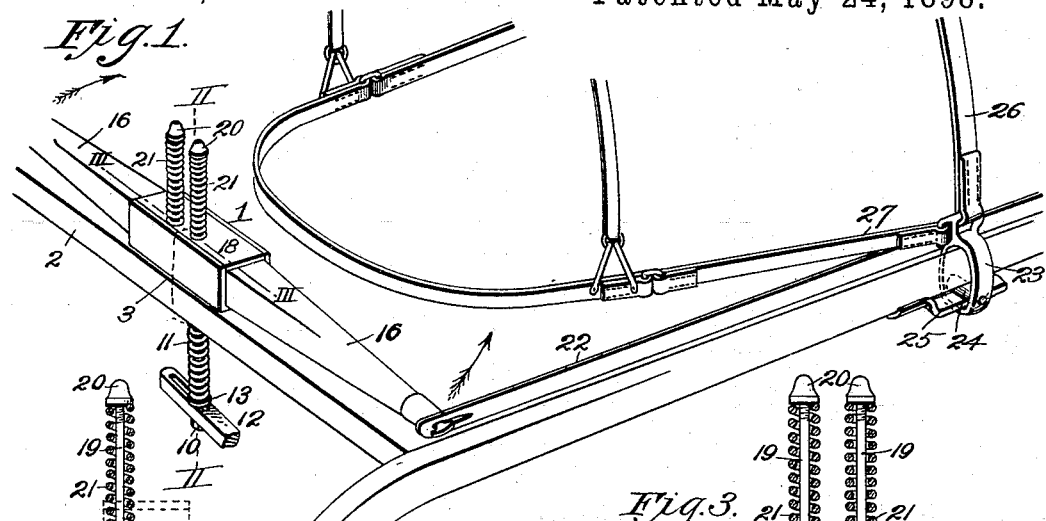
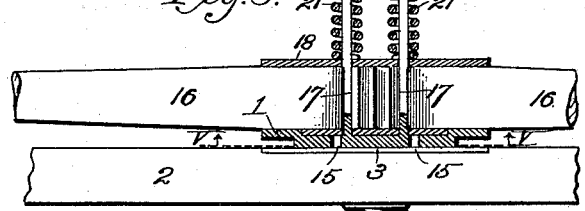
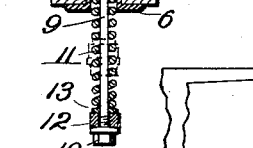
Witnesses:
Inventors,
C. B. Hardin—J. D. Mosby,
B. F. Higdon & Higdon
Attys.

UNITED STATES PATENT OFFICE.

CHARLES B. HARDIN AND JAMES D. MOSBY, OF KANSAS CITY, MISSOURI.

HORSE-DETACHER.

SPECIFICATION forming part of Letters Patent No. 604,469, dated May 24, 1898.

Application filed August 24, 1897. Serial No. 649,373. (No model.)

*To all whom it may concern:*

Be it known that we, CHARLES B. HARDIN and JAMES D. MOSBY, of Kansas City, Jackson county, Missouri, have invented certain new and useful Improvements in Horse-Detachers, of which the following is a full, clear, and exact description, reference being had to the accompanying drawings, forming a part thereof.
Our invention relates to horse-detachers; and it consists in certain novel and peculiar features of construction and combinations of parts, as will be hereinafter described and claimed.
The object of the invention is to produce a device of this character whereby the driver or other person in the vehicle hitched to the animal or team may positively and reliably free the horse or team in case it may be desirable to do so, as in case of a runaway.

A further object of the invention is to produce a device of this character which is simple, strong, durable, and cheap of manufacture.
In order that the invention may be fully understood, we will proceed to describe it with reference to the accompanying drawings, in which—

Figure 1 represents a perspective view of a portion of a single-horse vehicle and of the harness of the horse, both embodying our invention. Fig. 2 represents, on a larger scale, a section taken on the line II II of Fig. 1. Fig. 3 represents a section taken on the line III III of Fig. 1. Fig. 4 represents a plan view of a part of the device. Fig. 5 represents an inverted plan view of the singletree and the box inclosing the same. Fig. 6 represents, on a larger scale, a perspective view of a modified form of box. Fig. 7 represents a side view of a still further modified form, the single or double tree being shown in section. Fig. 8 represents a similar view of another modified form.
In the said drawings, with reference particularly to Figs. 1 to 5, inclusive, 1 designates a U-shaped casting secured longitudinally upon the cross-bar 2 of the shafts of the vehicle, a wear-plate 3, however, being interposed between the casting or "box," as it will hereinafter be termed, and the cross-bar to relieve the latter of undue wear. Said box is provided internally with a rectangular recess 4 in its base, and fitting in a flared opening or hole in the center of said base is the correspondingly-flared upper end of a tubular pivot 5, said pivot being provided with a flange 6 in its lower end which underlaps and is secured in any suitable manner to the said cross-bar 2. By reason of the pivot thus fitting in the flared opening of the box the latter is free to turn upon said pivot, but is at the same time held down upon the wear-plate 3 reliably.

7 designates a trip-plate which fits snugly in the rectangular recess 4 and is provided in its rear edge with two notches 8 for a purpose which will presently appear and with a central depending stem 9, which stem extends through and projects some distance below the pivot-tube 5. A nut 10 is mounted upon its lower end, and spirally encircling said stem is an expansive spring 11, which also is arranged within said tube. A lever 12, preferably slotted, fits loosely upon the stem 9 and is interposed between the nut 10 and the washer or collar 11, upon the latter of which the pressure of the spring is exerted.

The lever 12 is adapted to be pivoted to a fixed point on the wagon, (not shown,) so as to be convenient to the driver or occupant, and will be shaped or arranged according to the style of the vehicle, as will be readily understood.

In order to relieve the pivot of all strain except that naturally imposed by the tugs or traces, as hereinafter referred to, the wear-plate 3 is provided with a pair of upwardly-projecting guide-pins 14, engaging the segmental slots 15, extending centrally of the pivot.

The whiffletree comprises two similar sections 16, which at their inner ends are of rectangular form and fit snugly within the box 1. They are also provided in their rear edges with notches 17, which register with the notches 8 of the trip-plate 7, upon which said whiffletree-sections rest, as shown clearly in Figs. 2, 3, and 4.

18 designates a top plate, which fits snugly in the upper edge of the box and upon the upper side of the whiffletree-sections, which for the length of said box are completely incased. Said top plate 18 is provided with a pair of holes, which are arranged in vertical alinement with the notches 8 and 17, and extending vertically upward from the base of the box 1, through said notches and said holes or openings of the top plate, are stems or rods 19, carrying nuts or collars 20 at their upper ends, and spirally encircling said stems or rods and bearing at their opposite ends against said nuts or collars and the top plate are expansion-springs 21, which by such action hold the whiffletree-sections down to position, so that they operate under the strain imposed by the tugs or traces 22 as a single rigid whiffletree and are sufficiently strong to prevent the jolting of the vehicle from causing the dislocation of said sections, which, however, can be elevated by the proper manipulation of the lever 12 and against the resistance of the springs 21 until their lower edges clear the upper edge of the box 1, and immediately this position is reached it is obvious that the strain imposed by the traces will cause, first, a forward pivotal action on the part of said sections, as illustrated by arrows, Fig. 1, and then their disconnection from the box and from each other, this action being not impeded by the stems or rods 19 because of the fact that the notches 17 in the rear edges of said sections embrace said rods. In accomplishing this dislocation of the whiffletree the upward movement of the lever 12 first compresses the spring 11 and then elevates the trip-plate, which latter lifts the inner ends of the whiffletree-sections, together with the top plate 18, vertically upward until the dislocation of said sections takes place, as hereinbefore explained. Immediately the pressure of said lever is removed the plate 7 flies back to its original position, and the plate 18, assisted by the springs 21, descends into the box. By this arrangement it is obvious, therefore, that by the simple manipulation of a lever the whiffletree to which the draft-animal is attached can be totally disconnected in an instant from the vehicle; but it is also obvious that the breech-strap must be disconnected from the shafts; otherwise the draft-animals would not be reliably freed from the vehicle. In accomplishing this purpose we provide a pair of elliptic bands 23 of suitable material and partition the same horizontally by rubber-tired rollers 24. Said bands are slipped upon the shafts so that the latter rest upon said rollers, and the shouldered brackets 25 project through said bands and bear against the under side of said rollers. The bands are attached at their upper ends to the lower ends of the back-straps 26 and permanently to the breech-straps 27, so that as the animal is backed the rollers 24 will be caused to bear against the shoulders of the brackets 25 and cause a corresponding movement of the vehicle. In case of a runaway, however, as soon as the whiffletree is disconnected, as described, the forward movement of the animal, freed from direct contact with the vehicle, causes the elliptic bands to slide forward freely upon the tongues, the rollers 24 performing in this connection an antifriction function, so as to afford the least possible obstruction or interruption to the instantaneous disconnection of the animal and vehicle, as will be readily understood. By this arrangement, therefore, the runaway animal will carry off with him the harness uninjured at the time of his disconnection from the vehicle, and it is apparent that means may be cheaply provided whereby the shafts would be prevented from falling to the ground as the horse escapes, so that there will result in most cases no injury to the shafts, as would undoubtedly be the case if they fell to the ground on a rough street, the wagon having attained considerable momentum. The means, however, for supporting said shafts do not form a part of this invention and need not be illustrated or described herein.

Referring now to Fig. 6 in particular, it will be noticed that we employ a box as before, but that the box in this instance is of somewhat different construction—that is to say, 28 designates an L-shaped casting which forms the bottom and the rear side of the box and embraces the corresponding surface of the whiffle or doubletree, as the case may be.

29 designates the front side of the box, and it is hinged at its lower end to the front end of the casting 28. The top plate is of inverted-L shape, comprising the horizontal or cap portion 30, the vertically-depending front arm 31, which just overlaps the front side and upper or free edge of the hinged side 29 of the box, and the rear depending and longer arm 32, which embraces the rear side of the box. The whiffletree or doubletree 33, as hereinbefore stated, is embraced snugly within said box and is preferably constructed in all other respects precisely like the whiffletree hereinbefore described, and the interior construction of the box and means for raising or lowering the trip-plate in this connection are precisely as before described. In this connection, however, it is obvious that the trip-plate need be raised only about one-fourth the distance it must be raised in the construction embodied in Figs. 1 to 5, inclusive, as it is only necessary to lift the whiffle or double tree until the arm 31 of the top plate clears the upper edge of the hinged arm 29 of the box. Immediately this takes place the pressure of the whiffle or double tree occasioned by the pull of the draft-animal or animals causes said hinged arm to swing downward out of the way and permit of the escape of the whiffle or double tree.

In Fig. 7 we have illustrated a construction peculiarly applicable to doubletrees, though this also may be used in connection with vehicles drawn by a single animal. In this case the trip-plate is dispensed with, together with its connections, and in lieu of the spring 21 and the stems or rods 19 we employ a spring and rod or springs and rods, if desired, below the tongue of the vehicle, thus leaving the space above the doubletree entirely clear. In this case the doubletree is preferably of a single piece, but may be in two sections, if desired, as by making it in two sections the draft-animals may be separated at the same time that they are disconnected from the vehicle. The harness connection between them, however, may remain.

The box and cap or cover illustrated in Fig. 7 is like the corresponding parts of Fig. 6, and in addition said cap or cover is provided with a rib 34, secured to or cast integral with it. Said rib extends vertically downward and is formed with a vertically-elongated loop 35, which embraces the tongue of the vehicle, with a forwardly-extending arm 36 below the tongue, and with an upwardly-extending fork 37 at the front end of the portion 36, said fork also embracing the tongue for guide and strengthening purposes. A clip or bracket 38 is bolted or otherwise secured to the tongue in lieu of the plate 3, and upon the same is pivotally mounted the brackets, said brackets having slots (not shown) to play upon the guide bolts or pins 39, corresponding in function to the pins 14. (See Fig. 5.) The clip is provided with a depending stem or rod 40, which extends through the portion 36, and the spring 41, spirally encircling said rods, bears at its opposite ends against the clip 38 and said portion 36, so as to hold the cover tightly and reliably down upon the box, and thereby prevent the accidental dislocation of the doubletree. The lower end of the stem or rod 40 is engaged by a nut 10, and interposed between this nut and the portion 36 is the free end of a lever 12, by the proper manipulation of which the lid or cover may be elevated and the doubletree permitted to be drawn from position by the draft-animals.

In case it be desirable to release the single or double tree by means of a cord or flexible connection instead of a lever, we preferably construct the box as follows:

42 designates its base.

43 designates an L-shaped casting, which embraces the upper and rear sides of the whiffle or double tree and is pivoted to the rear edge of the base-plate, and is provided at its front end with a triangular-shaped head having downwardly and forwardly and upwardly and forwardly inclined shoulders 44 and 45.

The front side of the box consists of a pivoted plate 46, which is provided with a beveled shoulder at its free edge, which engages the correspondingly-beveled shoulder 44.

47 designates one or more levers, which are pivoted, preferably, to the tongue and are provided with teeth 48, which overlap and engage the beveled shoulder 45 of the pivoted cover portion of the box. A flexible connection 49, leading from a point convenient to the driver of the vehicle, is attached to the lower end of the lever, and the spring 50, attached to the lever and the tongue, tends to hold said lever down upon the cover, so as to prevent the jolting of the vehicle from loosening the doubletree. By this arrangement it is obvious that the strain imposed by the draft-animals upon the doubletree simply tends to clamp the lever more firmly down upon the cover, but when sufficient power is applied upon the pull connection 49 said lever is disconnected from below, and immediately this disconnection takes place the strain of the traces upon the doubletree causes the hinged section 46 of the box to swing downwardly and the hinged cover to swing upwardly, so that the doubletree strikes the lever 47 and forces it completely out of the way.

From the above description it will be apparent that we have produced horse-detaching appliances which embody the features of advantage enumerated as desirable in the statement of invention, and it is to be understood, of course, that various changes may be made in the detail construction, proportion, and arrangement of parts without departing from the spirit and scope or sacrificing any of the advantages of the invention.

Having thus described the invention, what we claim as new, and desire to secure by Letters Patent, is—

1. In a horse-detacher, the combination of a pivoted box, a double or whiffle tree secured therein, a top plate or cover for said box, and means to raise the whiffle or double tree out of said box, substantially as described.

2. In a horse-detacher, the combination of a pivoted box, a trip-plate held upon its base, a whiffle or double tree within the box and resting upon said plate, a top plate or cover for the box, and means to lift said trip-plate, said whiffle or double tree and said top plate, that the whiffle or double tree may be drawn from the box, substantially as described.

3. In a horse-detacher, the combination of a pivoted box, a trip-plate therein, a sectional whiffle or double tree within said box and upon said trip-plate, a top plate held down upon the whiffle or double tree with a yielding pressure, and means to raise said trip-plate against the resistance of said spring-pressure to expel the whiffle or double tree from the box, substantially as described.

4. In a horse-detacher, the combination of a pivoted box, provided with a pair of rods or stems projecting vertically upward, a notched trip-plate resting upon the base of said box, a sectional whiffle or double tree provided with registering notches and located in said box and upon said plate, a top plate held down upon said whiffle or double tree with a yielding pressure, and means to raise the trip-plate, substantially as described.

5. In a horse-detacher, the combination of a pivoted box, provided with a pair of rods or stems projecting vertically upward, a notched trip-plate resting upon the base of said box, a sectional whiffle or double tree provided with registering notches and located in said box and upon said plate, a top plate provided with holes fitting upon said stems or rods, nuts or collars upon the upper ends of said rods or stems, and expansive springs interposed between said top plate and said nuts or collars, substantially as described.

6. In a horse-detacher, the combination of a pivoted box, provided with a pair of rods or stems projecting vertically upward, a notched trip-plate resting upon the base of said box, a sectional whiffle or double tree provided with registering notches and located in said box and upon said plate, a top plate provided with holes fitting upon said stems or rods, nuts or collars upon the upper ends of said stems or rods, expansive springs interposed between said top plate and said nuts or collars, a stem depending from the trip-plate, a collar or nut upon its lower end, a lever loosely embracing said stem above said nut or collar, and a spring interposed between said plate and said lever, substantially as described.

7. In a horse-detacher, a pivoted box provided with a front side hinged at its lower edge, an L-shaped top plate overlapping the front side and free edge of said hinged plate, a whiffle or double tree arranged in said box, and means to raise said top plate to release said hinged plate, substantially as and for the purpose described.

8. In a horse-detacher, a pivoted box provided with a front side hinged at its lower edge, an L-shaped top plate overlapping the front side and free edge of said hinged plate, a whiffle or double tree arranged in said box, a spring for holding said top plate down upon the whiffle or double tree, and means for overcoming the pressure of said spring and raising said top plate, for the purpose described.

9. The combination of a vehicle provided with forwardly-opening loops at the under side of the shafts and a detachable whiffletree, with bands secured to the back and breech straps of the harness and encircling the shafts and the loops, and rollers journaled in said bands and interposed between the shafts and said forwardly-openings loops, substantially as and for the purpose described.

In testimony whereof I affix my signature in the presence of two witnesses.

CHARLES B. HARDIN.
JAMES D. MOSBY.

Witnesses:
M. R. REMLEY,
G. Y. THORPE.